July 8, 1969 L. HARRISON III 3,454,822

MEANS AND METHOD FOR GENERATING SHADOWS ON CONTINUOUS SURFACES IN AN IMAGE PRODUCED BY AN ELECTRONIC IMAGE GENERATOR

Filed Jan. 15, 1968

INVENTOR:
LEE HARRISON III
BY Kingsland, Rogers, Ezell, Eilers & Robbins
ATTORNEYS 3,454,822

MEANS AND METHOD FOR GENERATING SHADOWS ON CONTINUOUS SURFACES IN AN IMAGE PRODUCED BY AN ELECTRONIC IMAGE GENERATOR

Lee Harrison III, 8343 E. Briarwood Place, Englewood, Colo. 80110

Continuation-in-part of application Ser. No. 607,078, Jan. 3, 1967. This application Jan. 15, 1968, Ser. No. 697,814
Int. Cl. H01j 29/76
U.S. Cl. 315—22 10 Claims

ABSTRACT OF THE DISCLOSURE

A network for generating shadows for an electronically generated display by detection of negative-going signals corresponding to the receding of projections from a reference plane and comparing the detected signals with a ramp function signal related to the location of the light source that creates shadows. A signal reflecting lack of correspondence of the compared signals, indicating shadow areas, is used to modulate the intensity of beam of a display oscilloscope.

*Brief description of the invention*

This application is a continuation-in-part of application Ser. No. 607,078, filed Jan. 3, 1967, now Patent No. 3,364,382, which was a continuation of Ser. No. 240,970, filed Nov. 29, 1962, the latter having been abandoned.

In summary, this invention provides a network for generating shadow signals by differentiating a voltage $A(t)$ which varies with time and reintegrating it in parallel branches so that the signal $A(t)$ is recreated. However, one of the signals is operated upon before it is compared with the reintegrated signal $A(t)$. The system detects negative-going signals. Upon the detection of a negative-going signal, a negative ramp, the slope of which is determined by the elevation angle of the point of viewing the subject or the point of the light source, is substituted for the reintegrated $A(t)$ signals. The two signals are then compared. Whenever these signals are different, it means that, from the point of view of the observer or from the point of view of the light source, part of the signal $A(t)$ is behind some other part. An output signal from the comparator corresponding to the similarity or difference between the compared signals is used to modulate the intensity of the beam of a display oscilloscope to create shadows for the display or to prevent overlap.

*Detailed description of the invention*

Figures 1, 2:
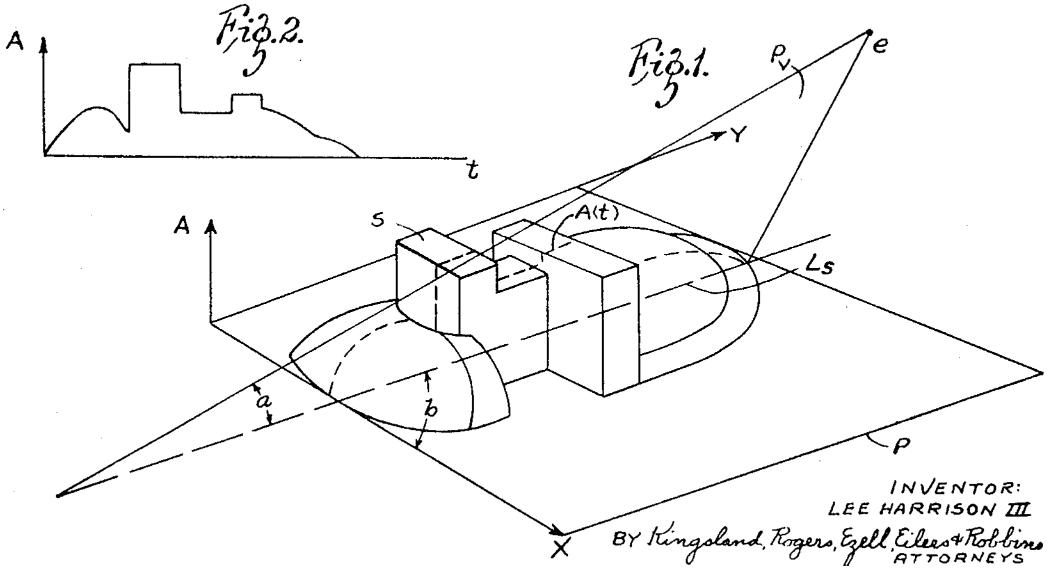
FIGURE 1 is a diagram of the geometric variables of generating shadow information of a display subject.
FIGURE 2 is a sectional view of the display subject in the plane $P_v$ of FIGURE 1.

FIGURES 1 and 2 illustrate the general approach to this shadow generator. A signal which represents the height of a surface above a reference plane is derived by scanning to produce a time varying voltage $A(t)$. The magnitude of the time varying voltage $A(t)$ represents the height of the surface above a line $L_s$, which lies in a reference plane.

In FIGURE 1, the X and Y coordinates define a reference plane P above which there are a plurality of irregular projection surfaces S. The A signal which defines the locus of points on the projection surfaces S is perpendicular to the plane P. The point $e$ from which the display subject is viewed or which represents the source of light that creates shadows behind the greater surface projections has an elevation angle $a$ with respect to the plane P. The point $e$ is assumed to be sufficiently far from the display subject to make the angle $a$ effectively constant for all points on the surface S. A vertical plane $P_v$ represents a typical plane normal to the reference plane P within which the viewer or light source views the display subject from the point $e$. A line $L_s$ is generated at the inter-section of this plane $P_v$ and the reference plane P. Another line $A(t)$ is generated by the intersection of the plane $P_v$ and the surface S. The line $L_s$ makes an azimuthal angle $b$ with X axis which is one coordinate of the reference plane P.

The surface S is interrogated by scanning along the line $L_s$ in a direction away from the point $e$.

FIGURE 2 shows a time varying wave form the magnitude of which is represented by a voltage which changes with time. As indicated in FIGURE 2, $A(t)$ is a function of the surface S and of the angle $b$.

By the approach illustrated in FIGURES 1 and 2, the $A(t)$ signal is used to determine which part of the wave form is in shadow, or behind some other part of the wave form, given the input elevation angle $a$ to either the light source or to the viewer's eye.

Figure 3:
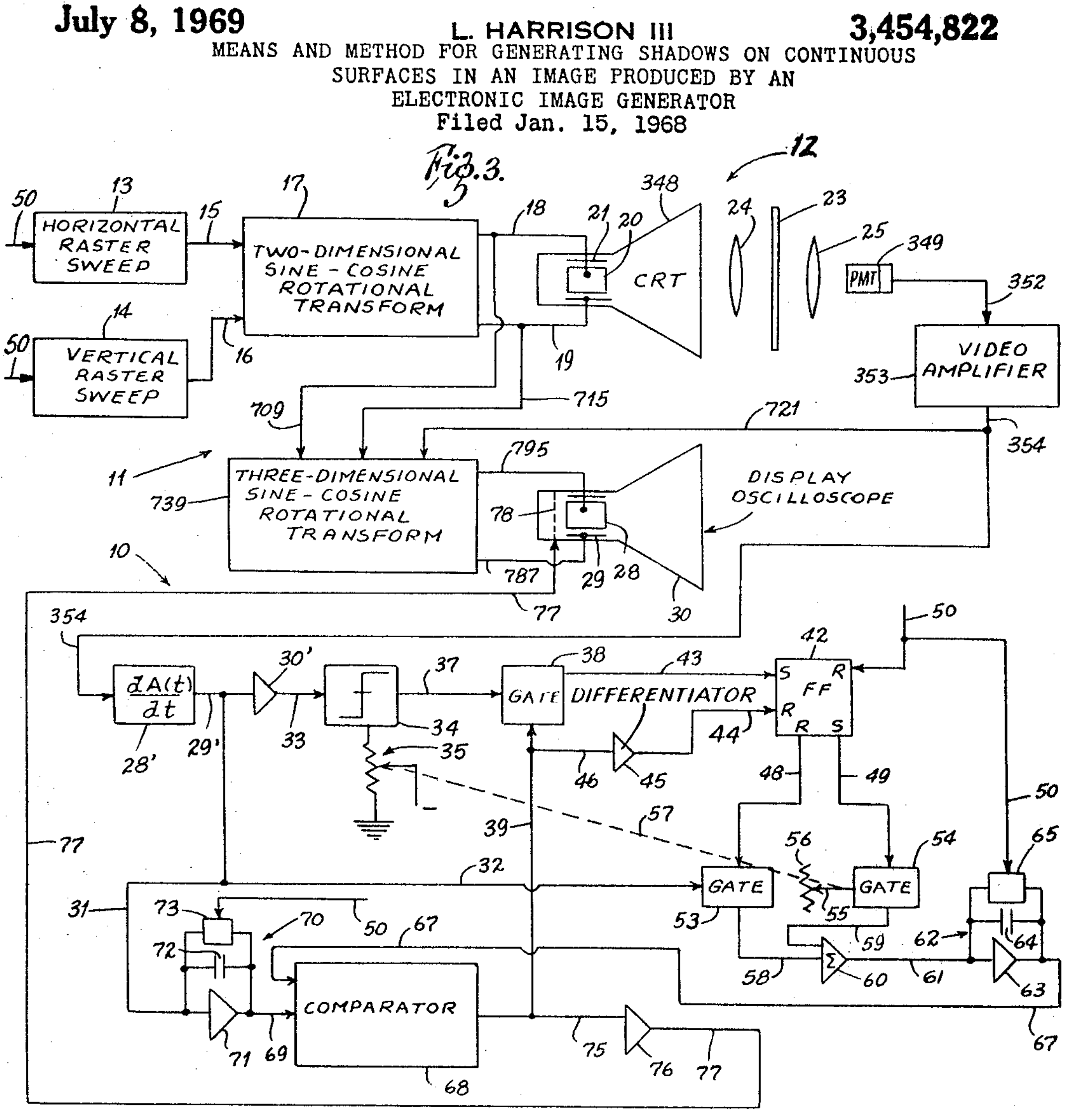
FIGURE 3 is a schematic diagram of the shadow generating network.

A network 10 for generating shadow information is shown in FIGURE 3. In this network, there is a sub-network 11 for generating the $A(t)$ signal that includes a scanner 12. The scanner 12 comprises a cathode ray tube 348 corresponding to the similarly numbered cathode ray tube 348 of the aforesaid Lee Harrison III Patent No. 3,364,382. This cathode ray tube 348 is programmed by a horizontal raster sweep generator 13 and a vertical raster sweep generator 14 that have output conductors 15 and 16 connected to a two-dimensional sine-cosine rotational transform 17. There are horizontal and vertical sweep voltage conductors 18 and 19 at the outputs from the transform 17. The rotational transform 17 may correspond to the X and Y portions of the rotational transform 739 of the aforesaid Lee Harrison III Patent No. 3,364,382 wherein the input X and Y conductors 709 and 715 correspond to the conductors 15 and 16 of this application and the $X^1$ and $Y^1$ output conductors 795 and 772 correspond to the conductors 18 and 19.

The conductors 18 and 19 are connected to the horizontal and vertical deflection plates 20 and 21 of the cathode ray tube 348. This tube 348 scans a film in a film holder 23 through suitable optics 24. The film in the film holder 23 is of varying density in proportion to the projection heights in the A direction of the various surfaces S above a reference plane P, such as shown in the example of FIGURE 1. When the beam of the cathode ray tube 348 scans the film in the holder 23, the intensity of the beam which passes through the film will be variable in proportion to the variations in density of the film. A photomultiplier tube 349 receives the varying intensity beam passed through the film and through a suitable lens 25 and transmits its output through a conductor 352 to a video amplifier 353. An output conductor 354 from the viedo amplifier 353 carries a voltage that varies in amplitude in proportion to the varying intensity of the beam passed to the photomultiplier tube 349. The foregoing is similar to the functions of the similarly numbered components of the aforesaid Lee Harrison III Patent No. 3,364,382 except for the difference in material contained on the film and in the programming of the scanner.

To provide three-dimensional component information of the display subject enabling a display from any selected angle, there is a three-dimensional sine-cosine rotational transform 739 having X, Y, and Z input conductors 709, 715, and 721 and H and V output conductors 795 and 785. This transform and its input and output conductors may be like the similarly numbered components of the aforesaid Lee Harrison III Patent No. 3,364,382 but in this application, the X and Y conductors 709 and 715 lead from the conductors 18 and 19 and the Z conductor 721 leads from the conductor 354. The H and V output conductors 795 and 787 carrying signals corresponding to the deflection voltages of the selected plane of viewing the display subject are connected to the horizontal and vertical deflection plates 28 and 29 of a display oscilloscope 30.

The $A(t)$ signal which represents a cross-section of a surface is introduced by the conductor 354 to a differentiator 28'. An output conductor 29' from the differentiator 28' is fed to an amplifier 30' and also to a pair of branch conductors 31 and 32. The output from the amplifier 30' is fed by a conductor 33 to a threshold detector 34 which has a variable voltage potentiometer input 35. An output conductor 37 from the threshold detector 34 is connected to a gate 38. The gate 38 is operated by an input signal in a conductor 39.

A flip-flop 42 has a "set" input conductor 43 leading from the gate 38. A "reset" input conductor 44 to the flip-flop 42 leads from a differentiator 45 having its input conductor 46 connected to the conductor 39.

The outputs from the flip-flop 42 are the "reset" output conductor 48 and the "set" output conductor 49. Another "reset" input conductor 50 to the flip-flop 42 is connected to a pulse generator of any suitable kind (not shown).

The "reset" output conductor 48 is connected to operate a gate 53 having an input conductor 32 which carries the differentiated $A(t)$ signal. The "set" output conductor 49 is connected to operate a gate 54 having an input conductor 55 carrying a variable voltage input representing the elevation angle as supplied by a potentiometer 56. The wipers of the potentiometers 35 and 56 are ganged together as indicated by the dotted line 57.

The gates 53 and 54 have output conductors 58 and 59 respectively, which lead to a summer 60, whose output conductor 61 leads to an integrator 62 having an amplifier 63 and capacitor 64 connected in parallel, with a switch 65 connected across the capacitor 64. The switch 65 is operated by voltages in the conductor 50 which represent line start pulses. A line start pulse is generated by means (not shown) at the beginning of each scanning line $A(t)$.

The output from the integrator 62 is fed into a conductor 67 to a comparator 68. The other input conductor 69 to the comparator 68 comes from the output of an integrator 70 that comprises an amplifier 71 and capacitor 72 connected in parallel with a switch 73 connected across the capacitor 72. The switch 73 is operated by the line start pulses in the conductor 50. The input to integrator 70 comprises the conductor 31 leading from the output of the differentiator 28'.

The comparator 68 generates a logical "one" when there is no comparison (a difference between the inputs in the conductors 67 and 69). When the voltages in the input conductors 67 and 69 are the same, there will be a logical "zero" output from the comparator 68.

The output from the comparator 68 is fed by a conductor 75 to a logical inverter 76. The inverter 76 has an output conductor 77 carrying an inversion of its input so the inverter output is a logical "one" when there is the same voltage in the conductors 67 and 69 leading to the comparator 68, and a "zero" when there is no comparison.

The output conductor 77 from the inverter 76 leads to the intensity control grid 78 of the display oscilloscope 30.

*Operation*

A line-start pulse in the conductor 50 assures the "reset" condition of the flip-flop 42 when each scan begins. This line-start pulse also discharges the capacitors 64 and 72 of the integrators 62 and 70 by closing the switches 65 and 73. This makes the voltages in the conductors 67 and 69 the same, which puts a logical "zero" in the conductors 75 and 39.

The gate 38, operating with the "zero" in the input conductor 39, is normally open and will remain open as long as this "zero" remains. The flip-flop 42 is already in a "reset" condition. The differentiator 45 passes a signal to its output conductor 44 only when the signal at its input 46 changes from a logical "one" to a logical "zero." Since the "zero" in the conductor 46 has no effect on the output from the differentiator 45, the flip-flop 42 remains in reset.

The line-start pulse also starts the raster sweep generators 13 and 14 and the time varying signal $A(t)$ is introduced to the conductor 354. The differentiator 28' differentiates the $A(t)$ signal to put the derivative of $A(t)$ into the conductor 29'.

Because the flip-flop 42 is in the "reset" state, the logical "one" is presented to the conductor 48 which operates the gate 53. Therefore, the gate 53 is open at this time, and the derivative of the voltage $A(t)$ is passed thru the gate 53 into the conductor 58, through the summer 60 to the conductor 61, and is integrated by the integrator 62.

The output from the integrator 63 is fed through the conductor 67 to the comparator 68. At the same time, the derivative $A(t)$ signal appearing in the conductor 29' is fed through the conductor 31 and is integrated by the integrator 70. The output in the conductor 69 is also presented to the comparator 68. The comparator will detect no difference between the signals in the conductors 67 and 69, and a logical "zero" will persist at its output conductor 75.

The differentiated $A(t)$ signal in the conductor 29 is also fed through the amplifier 30' to the threshold detector 34. The detector is set by its potentiometer control 35 to disregard all signals more positive than the negative setting of the potentiometer 56 to which the potentiometer 35 is ganged.

When the input to the threshold detector 34 is more negative than the threshold setting of the detector 34, the detector 34 passes the signal through the normally open gate 38 to the "set" input conductor 43 of the flip-flop 42. The flip-flop 42, which was previously in the "reset" state because of positive going $A(t)$ signals is flipped to the "set" state by the signal in the conductor 43.

With the flip-flop 42 in the "set" state, the "reset" signal which was previously in the conductor 48 changes from a logical "one" to a logical "zero," thereby closing the gate 53. The "set" output from the flip-flop 42 which feeds into the conductor 49 now assumes a logical "one" which opens the gate 54. The gate 54 then passes a DC signal generated by the variable potentiometer 56, this DC signal being presented to the summer 60 and thence to the integrator 62. The voltage in the conductor 55, which is eventually integrated by the integrator 62, is such that the output of the integrator 62 will be a negative-going ramp. The slope of this ramp is a function of the setting of the potentiometer 56 which corresponds to the variable angle $a$, representing the elevation of the point $e$ of the viewer or the light source.

Now the signal presented to the comparator 68 through the conductor 67 is different than the signal in the conductor 69. The output from the comparator 68 therefore becomes a logical "one" which closes the gate 38, but has no effect on the "reset" input conductor 44 to the flip-flop 42 because of the differentiator 45. The differentiator 45 passes a signal to the conductor 44 only when the output from the comparator 68 is changing from a logical "one" to a logical "zero." This happens when the signals in the conductors 67 and 69 to the comparator 68 are again the same and the output from the comparator 68 is changed to a "zero" logic condition. Now, when the voltage in the conductor 39 changes from a "one" to a "zero," the change is differentiated by the differentiator 45 to produce an output pulse in the conductor 44. This pulse is fed to the "reset" input 44 of the flip-flop 42, thereby putting the flip-flop in the "reset" condition. The gate 54 is again closed since the "set" output in the conductor 49 now carries a logical "zero" but the gate 53 is opened once more by the logical "one" which is in the conductor 48. Thus, the differentiated A(*t*) signal passes through the conductor 32, the gate 53, the summer 60, the integrator 62, and the conductor 67 to the comparator 68. Since the signal in the conductor 67 is now the same as the signal in the conductor 69, the output in the conductor 75 from the comparator 68 is again a logical "one."

The output in the conductor 75 is logically inverted thru the logic inverter 76. Therefore, a logical "one" appears in the conductor 77 when there is a comparison between the signals in the conductors 67 and 69, but a logical "zero" appears when there is no comparison.

The conductor 77 leads to the intensity control grid 78 of the display device 30 to maintain the intensity of the display beam when there is a logical "one" in the conductor 77 and to dim the beam to create shadows on the drawn display when there is a logical "zero" in the conductor 77.

Since the A(*t*) signal supplied to the differentiator 28' is variable according to the heights of points on the surface S above the reference plane P, it is now apparent that the generated negative-going ramp from the integrator 62 establishes the locations and lengths of shadows on parts of the surface S which, relative to the point *e*, are behind other higher parts. Thus, as the film in the film holder 23 is scanned and the image corresponding to it is displayed from any desired viewing angle, appropriate shadows are added by the modulated intensity of the display beam.

I claim:

1. A method of producing shadow information or preventing overlap in an electronically produced display comprising the steps of generating horizontal and vertical deflection voltages corresponding to a display scene to be drawn on the face of a display device, modulating a signal in predetermined relationship to the locus of projecting points on a surface of the display scene relative to a reference plane, producing a reference signal corresponding to a threshold, comparing the modulated signal with the reference signal, and modulating the intensity of the display drawn on the display device in response to the result of the comparing step.

2. The method of claim 1 including the steps of producing a derivative of the modulated signal, integrating the derivative signal, generating a ramp function signal, supplying the integrated signal to a comparing means, selecting which of the signals comprising the derivative signal and the ramp function is changing at a greater rate in a predetermined direction, integrating the selected signal, and supplying the integration of the selected signal to the comparator for enabling the said comparing step.

3. The method of claim 2 including detecting the threshold of the derivative signal in predetermined relation to the ramp function signal, and varying the ramp function signal and the detected threshold signal.

4. The method of claim 1 including the steps of generating voltages corresponding to three-dimensional coordinates of the locus of points on the surface of the display scene, resolving the three-dimensional coordinate voltages into the said horizontal and vertical deflection voltages.

5. A network for producing shadows or preventing overlap in an electronically produced display of the locus of points on a surface above a reference plane wherein the locations of the shadows or overlap are related to the position of a light source or a viewing point relative to the surface comprising means to modulate a signal in proportion to the distances of the points on the surface above the reference plane, means to derive signals corresponding to the rates of change of the modulated signal, means to establish a negative-going ramp function signal the rate of change of which is proportioned to the position of the light source or a viewing point relative to the reference plane, means to compare the detected rates of change of the modulated signal with the ramp function signal, and means to modulate the intensity of a display device in response to departures from identity between the compared signals and in synchronization with the electronic production of the display.

6. The network of claim 5 wherein the comparing means comprises a comparator, an integrator for producing the ramp function voltage, and an integrator for integrating the derived signals.

7. The network of claim 6 including means to detect when the rate of change of the derived signal toward negative is greater than the rate of the ramp function signal.

8. A network for modulating the intensity of an electronically produced display of the locus of points on a surface or surfaces represented by the display comprising means to generate an electric signal, means to modulate the signal in proportion to variations in the distances of the points from a reference plane, means to derive signals corresponding to the rates of change of the modulated signal, means to establish a reference signal corresponding to the inclination of a sight line along which the surface or surfaces are viewed or lighted, means to compare the derived signals with the reference signal, and means to modulate the intensity of the display in response to departures from identity between the compared signals and in synchronization with the electronic production of the display.

9. The network of claim 8 including means to vary the reference signal.

10. The network of claim 8 including means to detect those of the derived signals which exceed the reference signal in a pre-determined parametric value, means to transmit a signal to generate the aforesaid reference signal in response to the said detection of derived signals, signal comparator means, means to transmit integrated values of the derived signals to the signal comparator means, additional means to transmit integrated values of the derived signals to the comparator means, means triggered by the said detection of derived signals for transmitting the reference signal to the comparator means in place of the integrated values of derived signals transmitted by the said additional means, and means operable in response to the presentation of substantially identical values of an integrated derived signal and a reference signal to the comparator means to interrupt transmission of the reference signal and reinstate transmission of the integrated derived signals from the said additional means to the comparator means.

References Cited

UNITED STATES PATENTS 3,364,382 1/1968 Harrison ............ 315—18

OTHER REFERENCES

P. Vlahos: The Three Dimensional Display, Its Cues and Techniques, Information Display, November/December 1965, pp. 10–20.

RICHARD A. FARLEY, *Primary Examiner.*

T. H. TUBBESING, *Assistant Examiner.*

U.S. Cl. X.R.

315—18; 340—324